3,310,878
DRAFTING INSTRUMENT
John E. Giba, 1501 Brownlee Ave.,
Youngstown, Ohio 44514
Filed Apr. 5, 1965, Ser. No. 445,596
2 Claims. (Cl. 33—107)

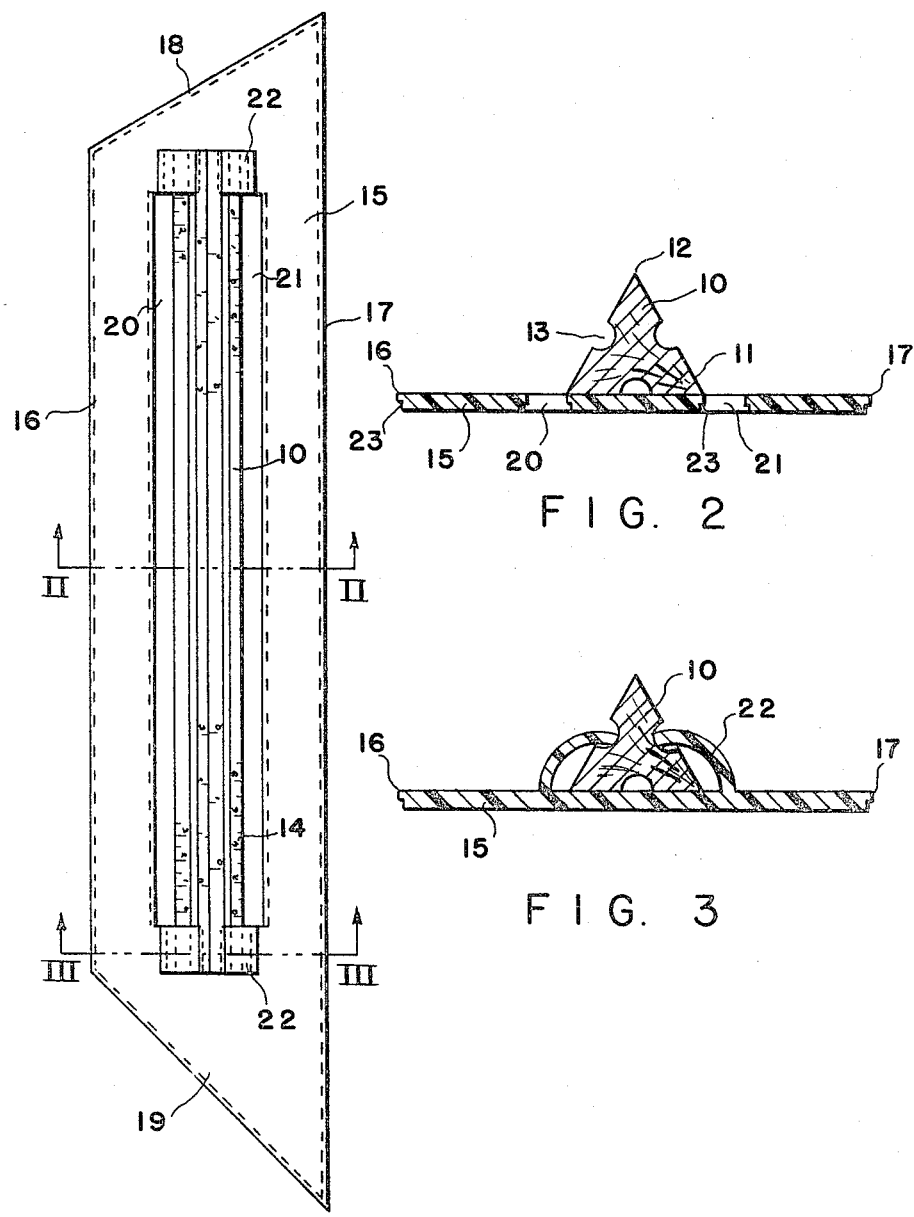

This invention relates to drafting instruments and more particularly to a novel and improved combination of a straight-edge device and a triangular engineer's or architect's scale. The primary object of the invention is to provide a combinational instrument of the kind suggested which is exceedingly unique in concept and low in cost but which, nevertheless, is much more useful in the hands of a draftsman, architect or engineer than any device heretofore proposed and of which I am aware for associating a scale with a straight edge.

In some of the devices of the prior art, the scale itself forms the straight edge to guide the user's pencil or pen but this is not practical because of the common practice of continuing the indented markings of the scale to the straight edge which makes for a correspondingly indented line on the work. Also, the common practice of applying points of a divider to the markings on the scale in transferring dimensions rapidly erodes the edge of the scale so that precision lines cannot be drawn on the work. In other devices it has been proposed to imprint the scale indicia directly on the flat body member bearing the straight edge but the disadvantage of this is that the scale cannot be changed for different work nor readily replaced after wear and scuffing.

An alternative solution to the problem as heretofore proposed has been to split the straight-edge implement flatwise for the slideable insertion of a scale having a measuring edge positioned adjacent to the straight edge but this has a disadvantage of providing only a single scale and/or thinning down the thickness of the stock making up the straight edge to such an extent that waviness occurs therein. Also, this thinness in stock precludes the rabbeting of the underside of the straight edge to avoid blotting when drawing with ink.

The above mentioned shortcomings of the prior art are overcome by my invention by resting a triangular scale directly on the top surface of a plate and forming slots in the plate in accurate alignment with the outer downward edges of the scale. The device is intended to be used in such manner that those straight edges of the slots which are contiguous to the feather edges of the bottom of the triangular scale are intended to be used as the drafting straight edges, and it should be noted that the recessive angles of the side faces of the scale with respect to the vertical planes of the contiguous side edges of the slots will result in the draftsman's pencil or pen always riding on the edges of the slots whereby the scale will be subjected to no wear.

Another advantage of the arrangement of the invention is that since the indented indicia on the scale extend downwardly to the precise edges of the slots extremely accurate measurement is possible. The overlying scale insures the flatness of the straight-edge device against the drafting board or paper, and since the bearing of the pen or pencil is against the substantial full thickness of a plate there is less tendency to deform the straight edges thereof.

Another object of the invention is to provide an assembled drafting instrument of the kind generally outlined above which inherently incorporates a convenient handgrip whereby the combined implement may be more quickly maneuvered over the surface of drawing paper. Yet another object of the invention is to incorporate in a combined article of the kind generally outlined of an arrangement whereby two sets of scales are simultaneously and instantaneously available for use, each with an associated straight edge for drawing.

A further object of the invention is the provision of an arrangement in a combined device having the characteristics outlined above for readily removing and replacing scales bearing different indicia while yet insuring that the indicia selected for use is openly viewable by the user without the interpositioning of any material which even though clear may, by reason of fraction, distort the apparent location of specific measurements.

The above and other objects and advantages of the invention will become apparent upon consideration of the following specification and the accompanying drawing wherein there is disclosed a preferred embodiment of the invention.

In the drawing:
FIGURE 1 is a plan view of the combined instrument and scale constructed in accordance with the principles; and
FIGURES 2 and 3 are sectional views taken along the lines II—II and III—III, respectively, of the assembly of FIGURE 1.

In the drawing, reference numeral 10 designates a conventional triangular scale commonly made of polished hardwood or plastic and provided with three flat faces 11 which terminate at three sharp apices 12. Such scales are also commonly provided with a fairly deep groove 13 in each flat face and are always provided with dimensional indicia 14 along either edge of each flat face and extending fully to the adjacent apices of the scale. For versatility each indicia has a different dimensional ratio, the identification of which is stamped on the flat faces immediately beyond the markings of the scale indicia, the scale being made sufficiently oversized in length for this purpose. The dimensional indicia are tailored for mechanical and civil engineering and architectural drafting use, for example, and therefore the triangular scales are commercially available in a variety of styles.

In accordance with the concept of my invention, I provide an elongated flat plate 15 preferably, but not necessarily, formed of a clear plastic which is rather stiff but not brittle or frangible. This plate 15 has a width considerably greater than the width of the scale with which it is to be used (normally 12" scales) and has spaced parallel side edges 16 and 17. The plate 15 is also of a length considerably greater than the length of the scale to provide the end straight edges 18 and 19. The latter may conveniently have a 45°–45° and 30°–60° relation, respectively, with the edges 16 and 17, although it should be understood that these end edges of the plate may be pointed or curved to provide additional angles or curved guides for the convenience of the draftsman. Also, I contemplate that the plate 15 may be suitably apertured inwardly of the side and end edges thereof to provide guides for lettering, symbols and other drafting assists and it will be obvious to those familiar with drafting equipment.

Parallel with and inwardly from the side edges 16 and 17 of the plate 15, I provide a pair of spaced parallel slots 20 and 21, respectively, and by referring to FIGURE 2 it will be noted that the distance between these slots is exactly equal to one of the flat faces of the scale 10. Thus, the apices of the flat face of the scale which lies on the top surface of the plate 15 are precisely at the top lines of the inner side edges of the slots 20 and 21.

The length of the slots 20 and 21 is slightly greater than the over-all length of the marked indicia on the scale 10 so that it should be apparent at once that the entire extent of the dimensional markings of the scale may be used without changing the position of the supporting plate 10 on the drawing board or paper. Further, it should be noted that this arrangement presents both sets of indicia which are down on the plate 15 to the open view of the draftsman, unimpeded by any clips or overlay of transparent material which may result in dimensional error due to refraction, etc.

Outwardly of the ends of the slots 20 and 21, I provide spring clips 22 which are rigidly carried by the plate 15 and which extend upwardly and inwardly into snug sliding fit with the two grooves 13 of the scale 10 which are above the upper plane of the plate 15. While these clips 22 are preferably molded integral with the plate 15 they may be made separately of varying materials and rigidly secured to the plate by any suitable expedient. Their intended function is to firmly but releasably hold the scale 10 on the plate 15 with a light clamping action between the scale and the plate. While the plate 15, including that strip or portion thereof which is between the slots 21, may have some tendency to bend in a vertical plane during handling of the instrument, this condition is automatically and instantaneously corrected upon the instrument being placed flat down onto a flat drawing board as will be understood. In a horizontal direction the much greater sectional modulus of the strips making up the plate precludes any appreciable deflection in a horizontal plane so that the edges 16 and 17 remain straight as does the edges of the slots 20, 21, which are coincident with the feathered lower apices of the scale.

As shown in FIGURE 2, the edges 16, 17 and the side edges of the slots 20, 21 are slightly rabbeted in their lower portions as shown at 23 to reduce smearing and blotting, particularly when working with ink. If desired, the edges 18 and 19 may be similarly treated.

Considering now the operation and use of the instrument described above, it should be at once apparent that the configuration and openness of the scale 10 provides a convenient handgrip whereby the instrument may be conveniently manipulated on the face of the drawing board or table. Secondly, the particular scale ratio or ratios selected for the job at hand are always automatically maintained in open view and in operative position so that less time is wasted in checking the ratio before each measurement layoff. Most draftsmen will naturally like the longer edge 17 against the T-square or triangle so that the ratio used for the principal view of the drawing will appear before the slot 20, and the scale will be inserted accordingly. The other ratio appearing at the slot 21 is, however, instantly available for subsidiary views. The straight edges being thus dimensioned a draftsman may proceed most efficiently because he can draw and measure at the same time, the drafting instrument riding along a smooth straight edge of the plate 15 and not on the scale. However, because the scale markings are brought down precisely to the guiding surfaces of the straight edges, the dimensioning may be very exact. There is no visual distortion of the positions of the scale markings so long as the draftsman keeps his eyes directly above the markings which is normal practice.

Another advantage of the assembly of the invention is that the feathered and marked edges of the scale or scales used are protected against mutilation through the use of dividers for transferring measurements for the use of the scale itself as a straight edge or even as a rest for a sharpened point.

While the invention has been specifically described as applied to a triangular scale and derives maximum benefit from such use, it should be understood that the invention is applicable when using flat double-edged scales having up to four sets of scale ratio indicias imprinted thereon. Also, since the end edges of the plate 15 are of substantial length, one of them may be conveniently related at 90° to the side edges 16, 17, so that vertical lines may be quickly drawn with the instrument based on the horizontal bar of the T-square. Various other embodiments and changes may be made without departing from the spirit or scope of my invention, and reference should accordingly be had to the appended claims in determining the scope of the invention.

I claim:

1. A combined measuring and drafting instrument comprising an elongated plate having spaced parallel and straight side edges at least one of which may be lodged against the horizontal bar of a T-square, spring clips near the extremities of said plate, a double-edged scale slideably received in and releaseably retained by said spring clips, said plate having a first elongated slot therein which is straight and parallel to said side edges and one elongated edge of which is coincident with a first edge of said double-edged scale while the second elongated edge of which is spaced a precise distance from said double-edged scale, said plate also having a second elongated slot in spaced parallel relation to said first elongated slot such that one elongated edge of said second slot is coincident with a second edge of said double-edged scale while the second elongated edge of which is spaced a precise distance from said double-edged scale, the arrangement being such that either of the scale indicia thus exposed to view may be readily used in drafting operations with a straight edge on said plate being coincident with the edge extremity of either of said two scale indicia.

2. A device according to claim 1 further characterized in that said scale is triangular in cross section with three flat faces terminating in three apices forming the periphery thereof, each of said faces having a centrally disposed longitudinal groove therein whereby the upper portion of the scale serves as a convenient handgrip to lift and manipulate the device during drafting operations.

References Cited by the Examiner

UNITED STATES PATENTS

| | | | |
|---|---|---|---|
| 986,611 | 3/1911 | Walk | 33—108 |
| 2,893,127 | 7/1959 | McIntosh | 33—109 |

FOREIGN PATENTS

| | | |
|---|---|---|
| 303,714 | 1/1929 | Great Britain. |
| 163,907 | 9/1949 | Australia. |
| 1,269,096 | 7/1961 | France. |

LEONARD FORMAN, *Primary Examiner.*

H. HAROIAN, *Assistant Examiner.*